US009313302B2

(12) United States Patent
Vincent et al.

(10) Patent No.: US 9,313,302 B2
(45) Date of Patent: Apr. 12, 2016

(54) STATELESS PACKET SEGMENTATION AND PROCESSING

(71) Applicant: Amazon Technologies, Inc., Reno, NV (US)

(72) Inventors: Pradeep Vincent, Kenmore, WA (US); Michael David Marr, Monroe, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/605,893

(22) Filed: Jan. 26, 2015

(65) Prior Publication Data

US 2015/0139241 A1 May 21, 2015

Related U.S. Application Data

(63) Continuation of application No. 13/397,554, filed on Feb. 15, 2012, now Pat. No. 8,942,236, which is a continuation of application No. 12/556,447, filed on Sep. 9, 2009, now Pat. No. 8,300,641.

(51) Int. Cl.
*H04L 12/951* (2013.01)
*H04L 29/06* (2006.01)
*H04L 29/08* (2006.01)
*H04L 29/12* (2006.01)

(52) U.S. Cl.
CPC ............ *H04L 69/22* (2013.01); *H04L 67/1097* (2013.01); *H04L 61/1511* (2013.01); *H04L 61/2007* (2013.01)

(58) Field of Classification Search
None
See application file for complete search history.

(56) References Cited

U.S. PATENT DOCUMENTS

| 4,939,382 A | 7/1990 | Gruodis et al. |
| 5,530,753 A | 6/1996 | Easter et al. |
| 5,539,736 A | 7/1996 | Johnson et al. |
| 5,799,086 A | 8/1998 | Sudia et al. |
| 5,819,087 A | 10/1998 | Le et al. |
| 5,878,256 A | 3/1999 | Bealkowski et al. |
| 5,920,705 A | 7/1999 | Lyon et al. |
| 5,937,169 A | 8/1999 | Connery et al. |

(Continued)

OTHER PUBLICATIONS

Viswanathan, A., "Virtualization with XEM," *Trusted Computing CS599*, University of Southern California, 21pp. (Spring 2007).

(Continued)

*Primary Examiner* — Hassan Phillips
*Assistant Examiner* — Duc Duong
(74) *Attorney, Agent, or Firm* — Kilpatrick Townsend & Stockton LLP

(57) ABSTRACT

High-speed processing of packets to, and from, a virtualization environment can be provided while utilizing segmentation offload and other such functionality of commodity hardware. Virtualization information can be added to extension portions of protocol headers, for example, such that the payload portion is unchanged and, when physical address information is added to a frame, a frame can be processed using commodity hardware. In some embodiments, the virtualization information can be hashed and added to the payload or stream at, or relative to, various segmentation boundaries, such that the virtualization or additional header information will only be added to a subset of the packets once segmented, thereby reducing the necessary overhead. Further, the hashing of the information can allow for reconstruction of the virtualization information upon desegmentation even in the event of packet loss.

20 Claims, 9 Drawing Sheets

(56) References Cited

U.S. PATENT DOCUMENTS

| | | | |
|---|---|---|---|
| 6,009,274 A | 12/1999 | Fletcher et al. | |
| 6,301,229 B1 | 10/2001 | Araujo et al. | |
| 6,385,727 B1 | 5/2002 | Cassagnol et al. | |
| 6,615,349 B1 | 9/2003 | Hair | |
| 6,665,725 B1 | 12/2003 | Dietz et al. | |
| 6,879,587 B1 | 4/2005 | Yadav et al. | |
| 6,944,854 B2 | 9/2005 | Kehne et al. | |
| 6,957,328 B2 | 10/2005 | Goodman et al. | |
| 6,961,791 B2 | 11/2005 | Cepulis et al. | |
| 7,031,297 B1 | 4/2006 | Shabtay et al. | |
| 7,031,322 B1 | 4/2006 | Matsuo | |
| 7,055,148 B2 | 5/2006 | Marsh et al. | |
| 7,136,384 B1* | 11/2006 | Wang | H04L 12/5601 370/395.1 |
| 7,251,745 B2 | 7/2007 | Koch et al. | |
| 7,260,650 B1 | 8/2007 | Lueckenhoff | |
| 7,266,595 B1 | 9/2007 | Black et al. | |
| 7,293,129 B2 | 11/2007 | Johnsen et al. | |
| 7,299,294 B1 | 11/2007 | Bruck et al. | |
| 7,305,668 B2 | 12/2007 | Kennedy et al. | |
| 7,305,711 B2 | 12/2007 | Ellison et al. | |
| 7,350,083 B2 | 3/2008 | Wells et al. | |
| 7,376,125 B1 | 5/2008 | Hussain et al. | |
| 7,406,518 B2 | 7/2008 | Lasserre | |
| 7,421,533 B2 | 9/2008 | Zimmer et al. | |
| 7,447,777 B1 | 11/2008 | Singh Ahuja et al. | |
| 7,506,149 B2 | 3/2009 | Rothman et al. | |
| 7,512,612 B1 | 3/2009 | Akella et al. | |
| 7,512,684 B2 | 3/2009 | Ronciak et al. | |
| 7,526,516 B1 | 4/2009 | Pavlyushchik et al. | |
| 7,586,936 B2 | 9/2009 | Arimilli et al. | |
| 7,616,615 B2 | 11/2009 | Sueyoshi et al. | |
| 7,630,368 B2 | 12/2009 | Tripathi et al. | |
| 7,730,295 B1 | 6/2010 | Lee et al. | |
| 7,739,422 B2 | 6/2010 | Hua et al. | |
| 7,739,487 B2 | 6/2010 | Mylly et al. | |
| 7,793,091 B2 | 9/2010 | Weikel et al. | |
| 7,796,646 B2 | 9/2010 | Das et al. | |
| 7,802,000 B1 | 9/2010 | Huang et al. | |
| 7,836,226 B2 | 11/2010 | Flynn et al. | |
| 7,869,428 B2 | 1/2011 | Shake et al. | |
| 7,904,518 B2 | 3/2011 | Marino et al. | |
| 8,102,881 B1 | 1/2012 | Vincent | |
| 8,155,146 B1 | 4/2012 | Vincent et al. | |
| 8,191,065 B2 | 5/2012 | Frank et al. | |
| 8,205,194 B2 | 6/2012 | Fries et al. | |
| 8,214,653 B1 | 7/2012 | Marr et al. | |
| 8,229,939 B2 | 7/2012 | Staddon et al. | |
| 8,274,518 B2 | 9/2012 | Blythe et al. | |
| 8,300,641 B1 | 10/2012 | Vincent et al. | |
| 8,312,263 B2 | 11/2012 | Bell et al. | |
| 8,381,264 B1 | 2/2013 | Corddry et al. | |
| 8,428,087 B1 | 4/2013 | Vincent | |
| 8,462,780 B2 | 6/2013 | Vincent | |
| 8,483,221 B1 | 7/2013 | Vincent et al. | |
| 8,601,170 B1 | 12/2013 | Corddry et al. | |
| 8,640,220 B1 | 1/2014 | Marr et al. | |
| 8,774,213 B2 | 7/2014 | Vincent et al. | |
| 8,806,576 B1 | 8/2014 | De Santis et al. | |
| 8,830,887 B2 | 9/2014 | Cordeiro et al. | |
| 8,887,144 B1 | 11/2014 | Corddry et al. | |
| 8,942,236 B1 | 1/2015 | Marr et al. | |
| 8,959,611 B1 | 2/2015 | Marr et al. | |
| 8,971,538 B1 | 3/2015 | Marr et al. | |
| 8,996,744 B1 | 3/2015 | Marr et al. | |
| 9,042,403 B1 | 5/2015 | Vincent et al. | |
| 2001/0044934 A1 | 11/2001 | Hirai et al. | |
| 2002/0073304 A1 | 6/2002 | Marsh et al. | |
| 2002/0080784 A1 | 6/2002 | Krumel et al. | |
| 2002/0091807 A1 | 7/2002 | Goodman et al. | |
| 2002/0092008 A1 | 7/2002 | Kehne et al. | |
| 2002/0104006 A1 | 8/2002 | Boate et al. | |
| 2002/0150243 A1 | 10/2002 | Craft et al. | |
| 2002/0157011 A1 | 10/2002 | Thomas, III et al. | |
| 2003/0005276 A1 | 1/2003 | French et al. | |
| 2003/0014626 A1 | 1/2003 | Poeluev et al. | |
| 2003/0023966 A1 | 1/2003 | Shimizu et al. | |
| 2003/0058860 A1 | 3/2003 | Kunze et al. | |
| 2003/0074657 A1 | 4/2003 | Bramley, Jr. | |
| 2003/0115471 A1 | 6/2003 | Skeba et al. | |
| 2003/0185207 A1 | 10/2003 | Nakahara | |
| 2003/0188176 A1 | 10/2003 | Abbondanzio et al. | |
| 2004/0015941 A1 | 1/2004 | Sekine et al. | |
| 2004/0024917 A1 | 2/2004 | Kennedy et al. | |
| 2004/0025036 A1 | 2/2004 | Balard et al. | |
| 2004/0049669 A1 | 3/2004 | Schelling et al. | |
| 2004/0071142 A1 | 4/2004 | Moriwaki et al. | |
| 2004/0088542 A1 | 5/2004 | Daude et al. | |
| 2004/0109443 A1 | 6/2004 | Gai et al. | |
| 2004/0117640 A1 | 6/2004 | Chu et al. | |
| 2004/0128549 A1 | 7/2004 | Poisner et al. | |
| 2004/0158702 A1 | 8/2004 | Tasaki et al. | |
| 2004/0162915 A1 | 8/2004 | Caronni et al. | |
| 2004/0187103 A1 | 9/2004 | Wickham et al. | |
| 2004/0199660 A1 | 10/2004 | Liu | |
| 2004/0249974 A1 | 12/2004 | Alkhatib et al. | |
| 2004/0255287 A1 | 12/2004 | Zhang et al. | |
| 2004/0268339 A1 | 12/2004 | Van Someren et al. | |
| 2005/0131997 A1 | 6/2005 | Lewis et al. | |
| 2005/0135416 A1 | 6/2005 | Ketchum et al. | |
| 2005/0144612 A1 | 6/2005 | Wang et al. | |
| 2005/0188102 A1 | 8/2005 | Madajczak | |
| 2005/0207421 A1 | 9/2005 | Suzuki | |
| 2005/0213603 A1 | 9/2005 | Karighattam et al. | |
| 2005/0243834 A1 | 11/2005 | Fukuda | |
| 2005/0265351 A1 | 12/2005 | Smith et al. | |
| 2006/0004944 A1 | 1/2006 | Vij et al. | |
| 2006/0015751 A1 | 1/2006 | Brickell et al. | |
| 2006/0026301 A1 | 2/2006 | Maeda et al. | |
| 2006/0047938 A1 | 3/2006 | Park et al. | |
| 2006/0047942 A1 | 3/2006 | Rothman et al. | |
| 2006/0075276 A1 | 4/2006 | Kataria et al. | |
| 2006/0075299 A1 | 4/2006 | Chandramouleeswaran et al. | |
| 2006/0080522 A1 | 4/2006 | Button et al. | |
| 2006/0107071 A1 | 5/2006 | Girish et al. | |
| 2006/0136475 A1 | 6/2006 | Karmakar et al. | |
| 2006/0143473 A1 | 6/2006 | Kumar | |
| 2006/0159088 A1 | 7/2006 | Aghvami et al. | |
| 2006/0174109 A1 | 8/2006 | Flynn et al. | |
| 2006/0182103 A1 | 8/2006 | Martini et al. | |
| 2006/0218390 A1 | 9/2006 | Loughran et al. | |
| 2006/0242637 A1 | 10/2006 | Betarbet et al. | |
| 2006/0259964 A1 | 11/2006 | Maldonado et al. | |
| 2006/0277346 A1 | 12/2006 | Doak et al. | |
| 2006/0294305 A1 | 12/2006 | Ballard et al. | |
| 2007/0011491 A1 | 1/2007 | Govindarajan et al. | |
| 2007/0016781 A1 | 1/2007 | Asokan et al. | |
| 2007/0168652 A1 | 7/2007 | Mylly et al. | |
| 2007/0201471 A1* | 8/2007 | Sharma et al. | 370/392 |
| 2007/0204257 A1 | 8/2007 | Kinno et al. | |
| 2007/0206535 A1 | 9/2007 | Sood et al. | |
| 2007/0223483 A1 | 9/2007 | Huang et al. | |
| 2007/0226727 A1 | 9/2007 | Yeh et al. | |
| 2007/0253387 A1 | 11/2007 | Crampton et al. | |
| 2008/0002663 A1 | 1/2008 | Tripathi et al. | |
| 2008/0083036 A1 | 4/2008 | Ozzie et al. | |
| 2008/0086729 A1 | 4/2008 | Kondoh et al. | |
| 2008/0104701 A1 | 5/2008 | Peacock et al. | |
| 2008/0147965 A1 | 6/2008 | Eriksson et al. | |
| 2008/0189697 A1 | 8/2008 | Kachroo et al. | |
| 2008/0225875 A1 | 9/2008 | Wray et al. | |
| 2008/0244553 A1 | 10/2008 | Cromer et al. | |
| 2008/0267177 A1 | 10/2008 | Johnson et al. | |
| 2008/0295098 A1 | 11/2008 | Cardona et al. | |
| 2008/0307229 A1 | 12/2008 | Andersson et al. | |
| 2009/0015867 A1 | 1/2009 | Ukegawa et al. | |
| 2009/0034431 A1 | 2/2009 | Nagarajan et al. | |
| 2009/0077280 A1 | 3/2009 | Anderson et al. | |
| 2009/0077634 A1 | 3/2009 | Hung et al. | |
| 2009/0089764 A1 | 4/2009 | Lai et al. | |
| 2009/0094421 A1 | 4/2009 | Lewis et al. | |
| 2009/0138875 A1 | 5/2009 | Rothman et al. | |
| 2009/0178033 A1 | 7/2009 | Challener et al. | |
| 2009/0238209 A1 | 9/2009 | Ju | |

(56) References Cited

U.S. PATENT DOCUMENTS

| | | | |
|---|---|---|---|
| 2009/0249059 | A1 | 10/2009 | Asano |
| 2009/0257440 | A1 | 10/2009 | Yan et al. |
| 2009/0296571 | A1 | 12/2009 | McCourt et al. |
| 2009/0300149 | A1 | 12/2009 | Ferris et al. |
| 2010/0023777 | A1 | 1/2010 | Prevost et al. |
| 2010/0031000 | A1* | 2/2010 | Flynn et al. ............... 711/216 |
| 2010/0049882 | A1 | 2/2010 | Tsao et al. |
| 2010/0049900 | A1 | 2/2010 | Chiou et al. |
| 2010/0064048 | A1 | 3/2010 | Hoggan |
| 2010/0070623 | A1 | 3/2010 | Sawada |
| 2010/0088500 | A1 | 4/2010 | Ball et al. |
| 2010/0100733 | A1 | 4/2010 | Jaber et al. |
| 2010/0107162 | A1 | 4/2010 | Edwards et al. |
| 2010/0125856 | A1 | 5/2010 | Dash et al. |
| 2010/0128605 | A1 | 5/2010 | Chavan et al. |
| 2010/0161737 | A1 | 6/2010 | Consul et al. |
| 2010/0185926 | A1* | 7/2010 | Lawson et al. ............ 714/807 |
| 2010/0199078 | A1 | 8/2010 | Shih et al. |
| 2010/0217984 | A1 | 8/2010 | Hill et al. |
| 2010/0223397 | A1 | 9/2010 | Elzur et al. |
| 2010/0232435 | A1* | 9/2010 | Jabr et al. ................. 370/392 |
| 2010/0257523 | A1 | 10/2010 | Frank |
| 2010/0266132 | A1 | 10/2010 | Bablani et al. |
| 2010/0293289 | A1 | 11/2010 | Hsu et al. |
| 2011/0087721 | A1 | 4/2011 | Huang et al. |
| 2011/0200057 | A1 | 8/2011 | Zhou et al. |
| 2011/0283274 | A1 | 11/2011 | Krzyzanowski et al. |
| 2012/0079563 | A1 | 3/2012 | Green et al. |
| 2012/0144179 | A1 | 6/2012 | Iyigun et al. |
| 2012/0250686 | A1 | 10/2012 | Vincent |
| 2013/0031190 | A1 | 1/2013 | Chan et al. |
| 2014/0351893 | A1 | 11/2014 | Corddry et al. |
| 2015/0160948 | A1 | 6/2015 | Marr et al. |
| 2015/0199519 | A1 | 7/2015 | Marr et al. |

OTHER PUBLICATIONS

USPTO Non-Final Office Action dated Jul. 10, 2012, for U.S. Appl. No. 12/885,258, filed Sep. 17, 2010. 25 pages.
USPTO Final Office Action dated Nov. 11, 2012, for U.S. Appl. No. 12/885,258, filed Sep. 17, 2010. 10 pages.
USPTO Notice of Allowance dated Jan. 9, 2013, for U.S. Appl. No. 12/885,258, filed Sep. 17, 2010. 5 pages.
USPTO Non-Final Office Action dated Oct. 31, 2012, for U.S. Appl. No. 13/076,339, filed Mar. 30, 2011. 13 pages.
USPTO Notice of Allowance dated Feb. 14, 2013, for U.S. Appl. No. 13/076,339, filed Mar. 30, 2011. 8 pages.
USPTO Non-Final Office Action dated Sep. 19, 2014, for U.S. Appl. No. 13/903,842, filed May 28, 2013. 12 pages.
USPTO Notice of Allowance dated Jan. 21, 2015, for U.S. Appl. No. 13/903,842, filed May 28, 2013. 8 pages.
U.S. Appl. No. 12/554,690, filed Sep. 4, 2009, Titled: Firmware Updates From an External Channel.
U.S. Appl. No. 12/554,777, filed Sep. 4, 2009, Titled: Firmware Updates Inaccessible to Guests.
U.S. Appl. No. 12/556,447, "Non-Final Office Action", Apr. 3, 2012, 10 pages.
U.S. Appl. No. 12/556,447, "Non-Final Office Action", Aug. 3, 2011, 6 pages.
U.S. Appl. No. 12/556,447, "Notice of Allowance", Jul. 17, 2012, 7 pages.
U.S. Appl. No. 12/556,447, "Notice of Allowance", Nov. 28, 2011, 7 pages.
U.S. Appl. No. 13/397,554, "Notice of Allowance", Sep. 30, 2014, 8 pages.
U.S. Appl. No. 13/539,069, filed Jun. 29, 2012, Titled: Secured Firmware Updates.
U.S. Appl. No. 14/601,004, filed Jan. 20, 2015, Titled: Secure Packet Management for Bare Metal Access.
U.S. Appl. No. 14/635,923, filed Mar. 3, 2015, Titled: Firmware Validation From an External Channel.
Abramson et al., "Intel Virtualization Technology for Directed I/O", Intel Technology Journal, vol. 10, Issue 3, (Aug. 10, 2006), 96 pages.
"BIOS Boot Specification", Version 1.01, Compaq Computer Corporation, Phoenix Technologies Ltd., Intel Corporation (Jan. 11, 1996), 46 pages.
"Booting", Wikipedia, Dec. 20, 2008, https://web.archive.org/web/20081220125153/http://en.wikipedia.org/wiki/Booting, 7 pages.
"Hub", Webster's Third New International Dictionary, 1993, 3 pages.
"Preboot Execution Environment (PXE) Specification", version 2.1, Intel Corporation (Sep. 20, 1999), 103 pages.

* cited by examiner

STATELESS PACKET SEGMENTATION AND PROCESSING

CROSS-REFERENCE TO RELATED CASES

This application is a continuation of allowed U.S. patent application Ser. No. 13/397,554, entitled "Stateless Packet Segmentation and Processing," filed Feb. 15, 2012 which is a continuation of, and claims priority to, U.S. patent application Ser. No. 12/556,447, filed Sep. 9, 2009, entitled "Leveraging Physical Network Interface Functionality for Packet Processing," each of which is incorporated herein by reference for all purposes.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In some cases, users may want special hardware or full access to specific resources. Such access comes with risks for providers of those resources, however, as in a cloud or other shared environment there typically will be other users sharing those resources at various times, and a modification of the resource by one user can potentially be detrimental to subsequent users. In cases where users have a virtual address space, such that the customer network functions as a single virtual network without the restrictions or additional addresses of one or more additional physical networks, it can be desirable to provide for the processing and routing of packets pertaining to this virtual address space. When customers have bare access to the devices, however, performing the routing and processing on a device can potentially enable the user to modify the routing or other such processing of the packets. Further, such functionality cannot easily be moved to many existing hardware devices that are not exposed to the user, for reasons such as size restrictions, protocol limitations, etc.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing resources in an electronic environment. In various embodiments, users are provided with full or substantially full or "native" access to one or more hardware resources in a network, cloud, or other shared environment. In other embodiments, users have access to only one or more devices or components, such as a network interface card (NIC) graphics processing unit (GPU) on a peripheral component interconnect (PCI) bus, on a host machine. In situations where the users having access to such a resource can change frequently, it can be desirable to prevent users from modifying, or at least or at least track or act upon the attempted modifying, of firmware or other configuration or processing information for the resource, which can affect an ability of a subsequent user to effectively or securely utilize the resource.

Systems and methods in accordance with various embodiments provide for the processing of packets between a first address space, such as a customer or virtual address space, and a second address space, such as a cloud network provider or physical address space. Features such as segmentation and de-segmentation offload features of commodity devices, such as network interface cards (NICs), can be used to help reduce the overhead related to network traffic, particularly as it relates to a virtualized environment. Virtual and/or physical address and protocol information can be added to the received packets, such as to an extension portion of a transmission control protocol (TCP) or user datagram protocol (UDP). The payload portion of the segment then is not modified before routing and/or further transmission, providing for loss tolerance. Protocols such as TCP can allow for unused fields or portions in the relevant headers, which can be used to include the virtualization information for the packet. Where necessary, virtual or fake port information can be added such that devices can execute segmentation and other such actions.

In some embodiments, the virtual networking-related information can be encoded with redundancy, split into pieces, and added to the payload portion or I/O stream along, or otherwise in relation to, the segmentation boundaries. By adding the virtualization information to specific segments, the additional overhead can be minimal, the packets can still be routed using commodity hardware, and by using a hashing or similar mechanism, the virtualization information can be recreated even in the event that one or two of the packets containing the virtualization information are lost. The virtualization information when determined upon decapsulation can be used to process the received segments and request only those packets that were lost, in many circumstances.

Figure 1:
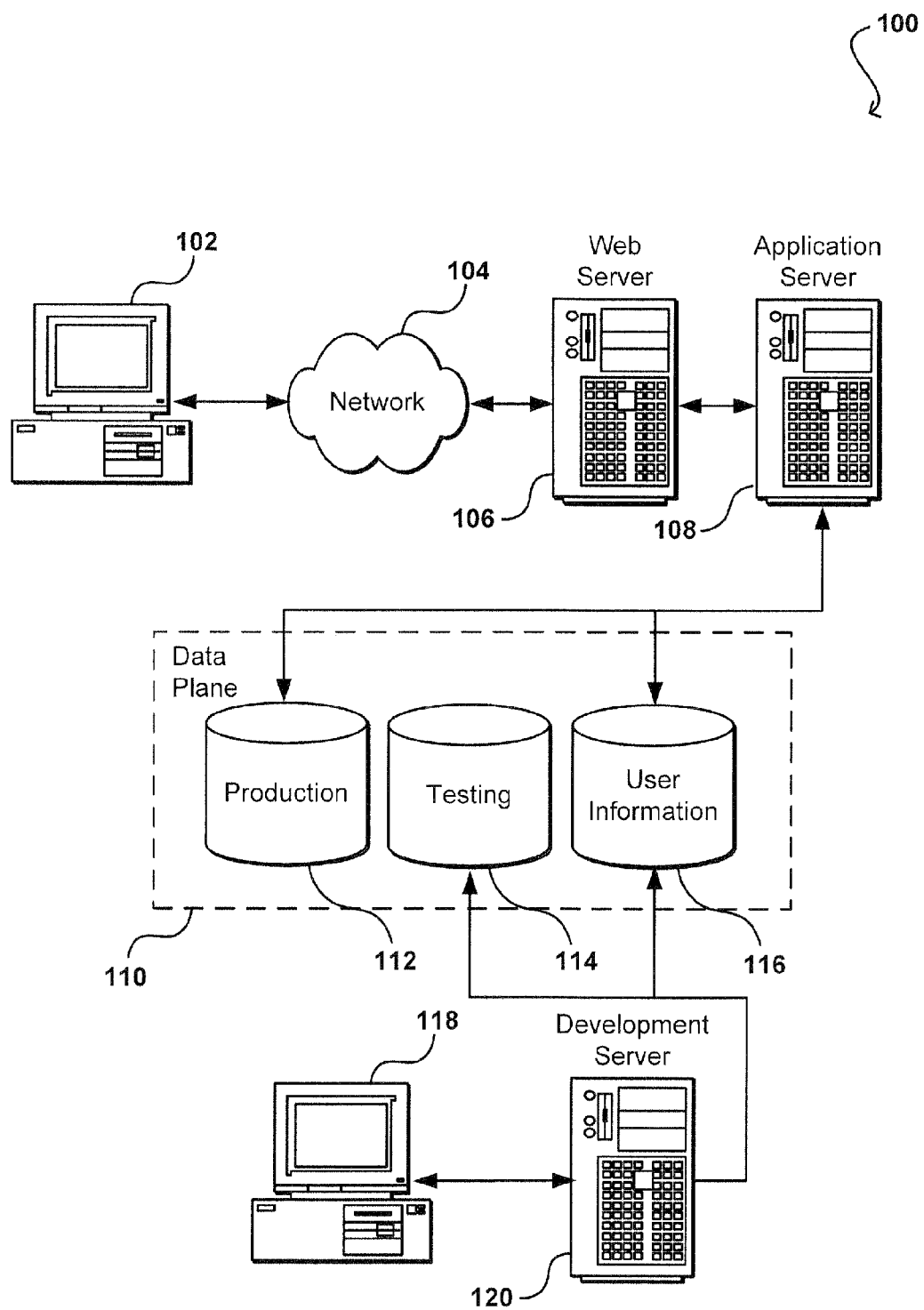
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing testing data 114, which can be used with the user information for the testing side. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 or development server 120, and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide at least one resource access gateway, or control plane, either as part of the data environment or in a path between the user and the data plane, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a cloud without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control plane 208 can be used in some environments to provide and/or manage access to various resources in the data plane 232. In a cloud computing environment, this can correspond to a cloud manager 210 or similar system that manages access to the various resources in the cloud. In one embodiment, a set of application programming interfaces (APIs) 220 or other such interfaces are provided that allow a user or customer to make requests for access to various resources. Once access is established, a resource is allocated, etc., a user can communicate directly with the resource to perform certain tasks relating to that resource, such as data storage or processing. The user can use direct interfaces or APIs to communicate with the data instances, hosts, or other resources once access is established, but uses the control plane component(s) to obtain the access.

Figure 2:
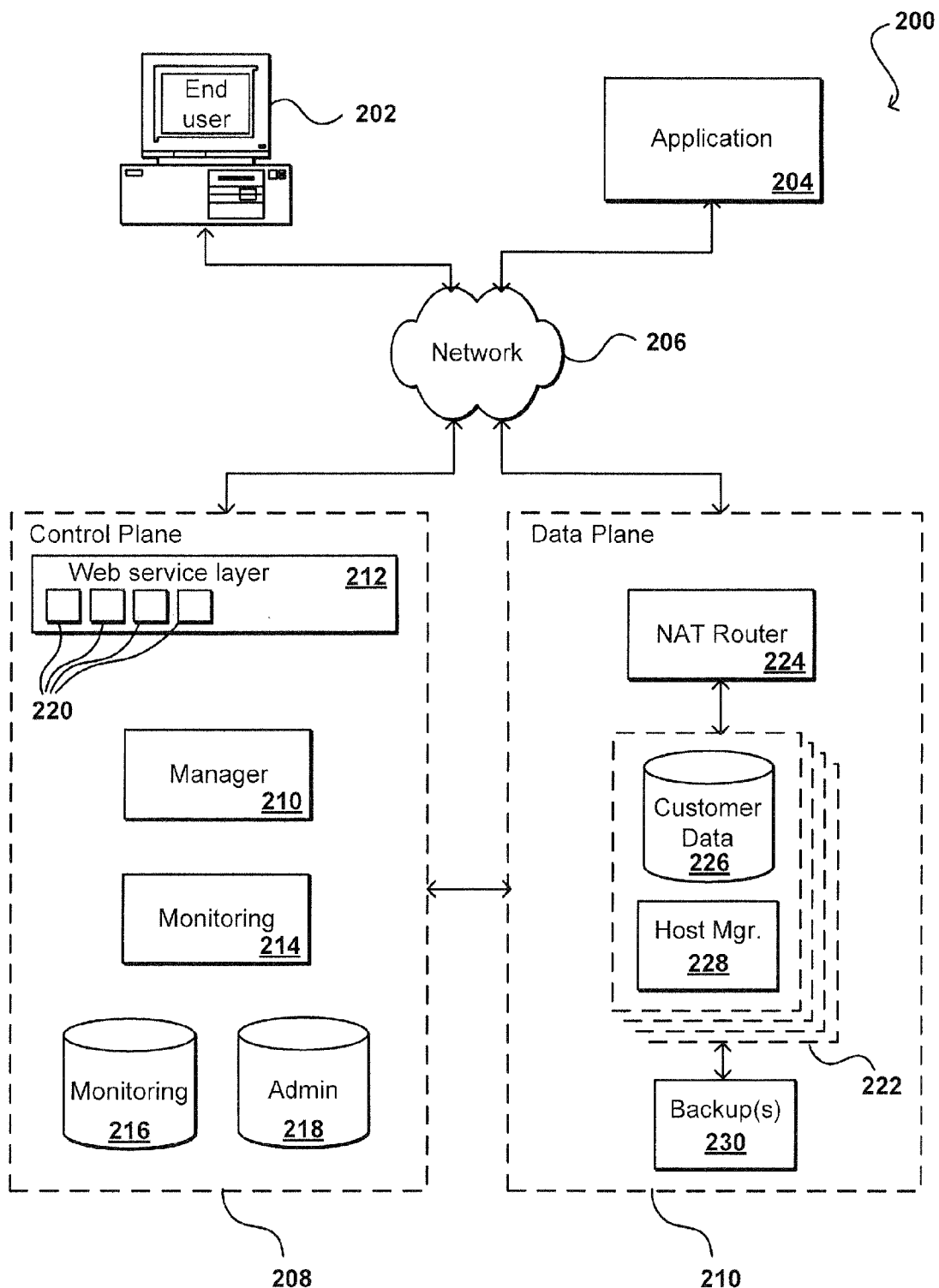
FIG. 2 illustrates an environment for providing access to various resources that can be used in accordance with one embodiment.

FIG. 2 illustrates an example of a configuration 200, such as may include a cloud computing manager system, that can be used in accordance with one embodiment. In this example, a computing device 202 for an end user is shown to be able to make calls through a network 206 to a control plane 208 (or other such access layer) to perform a task such as to obtain access to a specified resource or resource type. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data "plane," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs (or other such interfaces) for receiving Web services calls or other such requests from across the network 206, which a Web services layer 212 can parse or otherwise analyze to determine the steps or actions needed to act on or process the call. For example, a Web service call might be received that includes a request to establish a connection to a data repository for to execute a query for a user. In this example, the Web services layer can parse the request to determine the type of connection or access needed, the appropriate type(s) of resource needed, or other such aspects.

The control plane can include one or more resource allocation managers 210, each responsible for tasks such as validating the user or client associated with the request and obtaining or allocating access to the appropriate resource(s). Such a system can handle various types of request and establish various types of connection. Such a system also can handle requests for various types of resources, such as specific graphic processors or other types of hardware or hardware functionality, and can provide access to the appropriate resource(s). Components of the data plane, or the resource layer of the cloud, can perform the necessary tasks to provide the resource. For access to a data instance, for example, this can include tasks such as provisioning a data store instance, allocating a volume of off-instance persistent storage, attaching the persistent storage volume to the data store instance, and allocating and attaching an IP address (derived from DNS mappings) or other address, port, interface, or identifier which the customer can use to access or otherwise connect to the data instance. For tasks such as obtaining processing of an instruction using a particular type of hardware, for example, the components of the data plane, in conjunction with the control plane, can perform actions such as provisioning a device for a user and providing shared and/or dedicated access to the resource for a period of time at a particular level of access to the resource. In this example, a user can be provided with the IP address and a port address to be used to access a resource. A user then can access the resource directly using the IP address and port, without having to access or go through the control plane 208.

The control plane 208 in this embodiment also includes at least one monitoring component 214. When a data instance or other resource is allocated, created, or otherwise made available in the data plane, information for the resource can be written to a data store accessible to the control plane, such as a monitoring data store 216. It should be understood that the monitoring data store can be a separate data store or a portion of another data store. A monitoring component 214 can access the information in the monitoring data store 216 to determine information such as the past usage of resources by various users, a current number or type of threads or resources being allocated to a user, and other such usage information. A monitoring component also can call into components of the data environment to determine information such as the number of active connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") or similar data store 216, which can store information such as the general allocation granted to a user, throttling or limiting information for a user, resource permissions for a user, or any other such information that can be specified and/or updated by an administrator or other such user.

In an example where users request connections to various data instances, each instance 222 in the data environment can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager can also perform and/or manage the installation of software patches and upgrades for the data store and/or operating system. A host manager also can collect relevant metrics, such as may relate to CPU, memory, and I/O usage.

The resource manager 210 can communicate periodically with each host manager 228 for which a connection has been established, or to an administration server or other component of the resource environment, to determine status information such as load, usage, capacity, etc.

As discussed, once a resource is provisioned and a user is provided with an IP address derived from DNS mappings or other address or location, the user can communicate "directly" with components or resources of the data plane 232 through the network using a Java Database Connectivity (JDBC) or other such protocol to directly interact with that resource 222. In various embodiments, as discussed, the data plane takes the form of (or at least includes or is part of) a computing cloud environment, or a set of Web services and resources that provides data storage and access across a "cloud" or dynamic network of hardware and/or software components. An IP address derived from DNS mappings is beneficial in such a dynamic cloud environment, as instance or availability failures, for example, can be masked by programmatically remapping the IP address to any appropriate replacement instance for a use. A request received from a user 202 or application 204, for example, can be directed to a network address translation (NAT) router 224, or other appropriate component, which can direct the request to the actual resource 222 or host corresponding to the mapped address of the request. Such an approach allows for instances to be dynamically moved, updated, replicated, etc., without requiring the user or application to change the IP address or other address used to access the instance. In some cases, a resource 222 such as a data instance can have at least one backup instance 230 or copy in persistent storage.

As discussed, a resource can be shared among multiple users, clients, applications, etc., either concurrently or at different times, with varying levels of access or allocation. When a user has dedicated access to a machine or resource, the user might also have native or "bare metal" access to the resource for a period of time, depending on the type of access needed, and other such factors. Providing this level of access to a resource comes with potential risks for a provider of the resource, as a user having native access to the device can have the ability to modify firmware or other configuration information for the resource, which can affect the ability of a subsequent user to utilize the resource without first re-imaging or otherwise verifying the state of the resource.

Systems and methods in accordance with various embodiments enable a provider to grant a user or customer with substantially full access to a hardware resource with a reasonable level of security. This native-level access to remote hardware can be provided for resources such as servers, hosts, and cluster instances, for example. For resources such as cluster instances, customers may have native access to a subset of the hardware resources, such as may include peripheral devices connected using a component such as a peripheral component interconnect (PCI) bus. These peripheral devices can include network interface cards (NICs), graphics processing units (GPUs), and similar devices that would often be virtualized in a current cloud environment. In the some cases, a customer might have full access to an entire machine, or groups of machines, including any or all devices incorporated therein. For a group of machines such as a rack of servers, a user might be granted substantially full access to the entire rack, including any switches or other devices or components provided as part of the rack.

Certain providers present such hardware resources as a virtualized abstraction, such that management of the physical hardware can occur in a "more trustworthy" execution context, and can provide additional benefits such as the ability to migrate customers to different resources without interrupting execution and, since customers or "guests" are not tied to specific hardware, the ability for vendors to compete to provide the best utility computing value for price. Also, fewer and more simple guest instance images can be used, as guests do not need a multitude of hardware-specific drivers. Such virtualization can come with potentially significant costs, however, as virtualization can incur order-of-magnitude performance penalties for hardware that does not include native acceleration for virtualization, and virtualization of a particular hardware device can consume substantial resources unrelated to that device (e.g., a processor and/or memory used to virtualize a network interface). Also, virtualization support can lag years behind commodity availability of new hardware (e.g., video cards), and certain appliance hardware is often too specific or "niche" to ever warrant compelling virtualization support. There are potentially large market opportunities in supporting high-margin niche appliances or in being the first-to-market for cloud support of new hardware types. Providing such support through native access, however, can leave vulnerable various aspects of the internal cloud, such as provisioning technology, billing, resource utilization and balancing, and the network layer-2 layout, for example, and can violate threat models well beyond customer requirements.

Systems and methods in accordance with various embodiments can provide for "partial" or "substantially" full access to a resource, such as a host server, by providing users with native access to the host hardware or specific devices, such as cards plugged into a peripheral control bus or similar hardware datapath. In certain embodiments where specific levels of performance are an issue, technology such as an input/output memory management unit (I/O MMU) can be used to "assign" peripheral devices to guest operating systems (e.g., virtualization technology for directed I/O (Intel's VT-D)), effectively giving guests native access to only those peripheral devices. As should be apparent to one of ordinary skill in the art, a guest operating system (OS) can refer to different systems in different embodiments, such as a virtual machine hosting an running OS with at least partial non-virtualized access to some hardware or machine state that the OS or hypervisor depends upon including BIOS, configuration, etc., that is not under the administrative control of the hosting provider. In other embodiments, the guest OS might refer to an OS that is not under the administrative control of the hosting provider running without full virtualization. In one embodiment, an MMU can logically connect a direct memory access (DMA)-capable I/O bus (e.g., a PCI bus) to main memory on a host, and can manage mapping of I/O devices to physical addresses to regulate the flow of information from a guest to various PCI or similar devices. These devices can include, for example, graphics processing unit (GPU) co-processors, high-performance NICs, disk controllers, or other "niche" co-processing devices, such as cryptographic cards or hardware codecs. In some instances, virtualization or other such technology can be used to provide a level of separation between guests and host machines from the central system hardware (e.g., CPU, memory, etc), with native access potentially being available for specific devices on a given host. In other embodiments, native access can be provided to any hardware included in, or available for, a specific host.

One of the main issues with providing customers with native access to specific hardware is that customers may have the ability to modify privileged configuration or BIOS (basic I/O system) settings, or other firmware images on host hardware. These changes can persist across a reboot of the physical system, such that the hardware may not return to the same state that the hardware was in before that customer was granted access to the host or its device(s). In the case of dynamically configurable settings for a virtual machine monitor (VMM) managed by a Ring-1 hypervisor, for example, the changes would in general not persist across reboot, but could persist across instantiations of guest operating systems in a virtualized environment (e.g., chipset settings to support IOMMU technology). This ability for a customer to modify settings or firmware that otherwise should be immutable can have serious security implications. For example, malicious software (e.g., Trojans or viruses) can be inserted into firmware for various devices. Even if firmware changes do not involve intentionally malicious programming, however, the changes still can still be unintentionally damaging by causing performance and/or compatibility issues. Firmware flashing can potentially physically destroy the hardware irreparably (a.k.a. "bricking" the hardware). Certain technologies have been developed that may address at least some of these challenges, particularly for motherboard firmware or chipset configurations. These technologies include, for example, Trusted Platform Module (TPM), LaGrande Technology (LT) from Intel, measured boot technology, trusted boot technology, Dynamic Root of Trust (DRTM), and Static Root of Trust (SRTM) technology. None of these solutions, however, are known to address various issues specific to device firmware, entire hosts, and other such hardware aspects.

Figure 3:
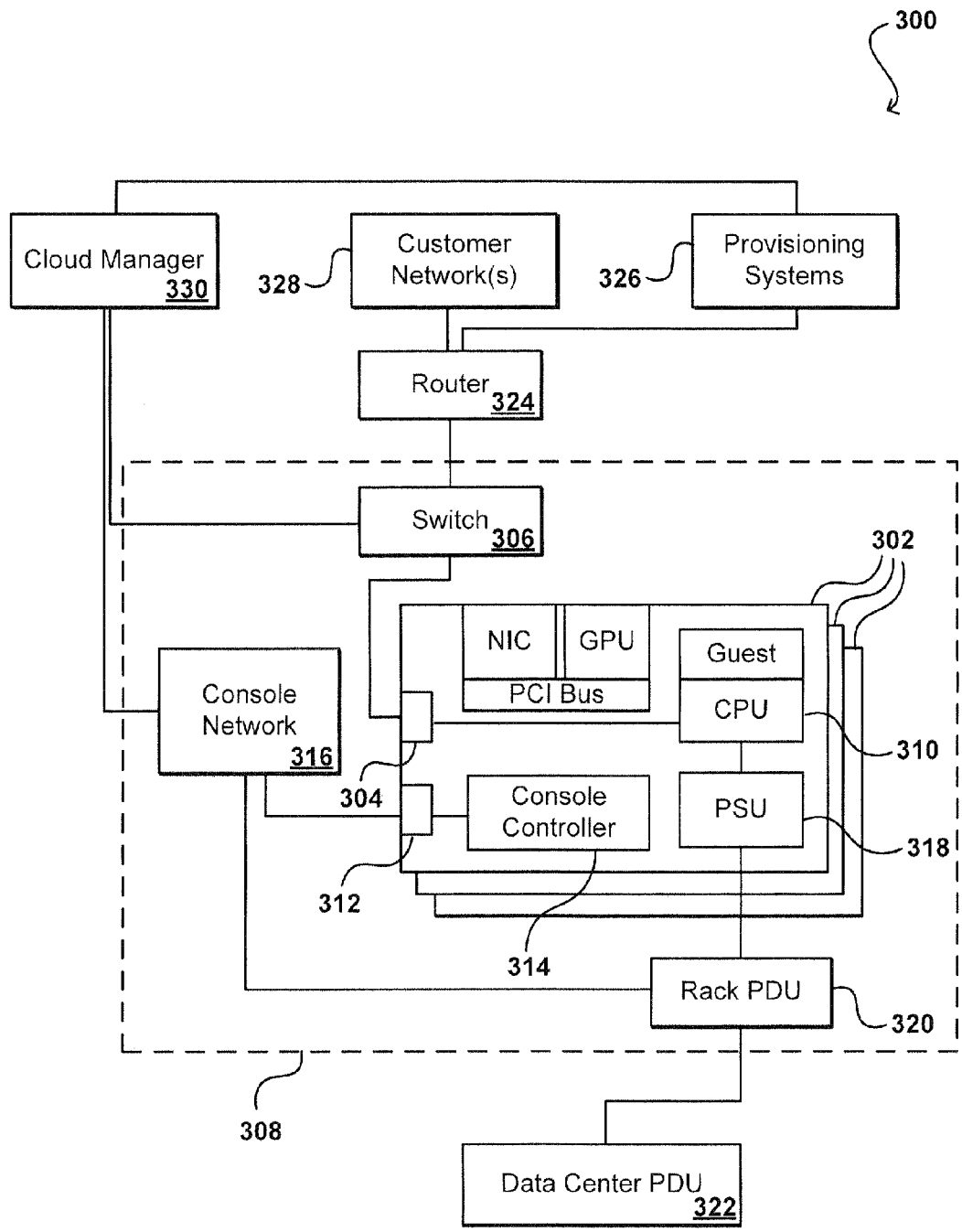
FIG. 3 illustrates a configuration for accessing specific hardware resources that can be used in accordance with one embodiment.

Systems and methods in accordance with various embodiments can prevent and/or monitor the access and/or manipulation of firmware images or configuration information by guests in a cloud or similar electronic environment. In certain embodiments, a customer can be provided with dedicated guest access to a hardware resource for any desired period of time, such as a matter of hours or even minutes. FIG. 3 illustrates an example of a configuration 300 that can be used to provide such native access to a customer in accordance with one embodiment. This example will be discussed with respect to granting a user access to a peripheral device in a host machine using conventional PCI-based technology, but it should be understood that this is merely an example and that approaches within the scope of the various embodiments can be used with any appropriate hardware (including based on different bus technologies or with greater or lesser degrees of system integration within individual components or "chips"), software, and protocols currently used or subsequently developed for such purposes.

This example configuration 300 includes a set of host devices 302, such as servers or similar devices, that each can have a series of network ports 304. Some of these ports can function as "production" ports which connect each host to at least one network switch 306 capable of processing and routing network traffic to/from each device. In some embodiments the network switch can be a "smart" network switch, while in other embodiments segregation can happen at a higher level in the network than the first tier of switches. In a data center example, there might be one smart switch for each rack of servers 308, for example. At least one of these network ports 304 can host traffic for a guest operating system, where the guest is effectively operating "on top of" at least one central processing unit (CPU) 310 in the allocated or partitioned host device (e.g., server) 302 that has access to this production network port. The host device 302 also can have at least one console port 312 and a console controller 314, which can connect to a separate console network 316. This "console network" also can be implemented using the same network technology as the "production network," such as Ethernet technology. In some embodiments, at least some of these ports can be merged but logically separated (e.g., muxed on the same physical port). Each host device also can have one or more dedicated power supply units (PSUs) 318, which can be accessed by the console controller and/or the main CPU, whereby the machine can be powered off via either the host CPU or a device on the network, for example. The power supply for every server in a rack can be connected to a rack power distribution unit (PDU) 320, which can be connected by a higher power cable to one or more data center PDUs 322, each of which can support multiple rack PDUs. In some cases, the hosts 302 can be powered on and off by running a line to the console controller from the rack PDU with relays or other such components to power cycle each device.

At least one router 324 can connect the host devices to one or more provisioning systems 326, and the switch and/or router can manage access to these provisioning systems. In some embodiments, network traffic within a rack is aggregated in order to minimize the number of cables leaving each rack. In some embodiments a capability such as a preboot execution environment (PXE) exists on a host machine 302 at the production network port 304, such that power can be cycled using the console and when the machine boots the PXE code can execute on the network port. PXE access could also be enabled or disabled depending on the type of reboot that has been authorized. For example, reboots could be allowed from local images on the host for customer initiated reboots, but PXE access can be disabled upstream. When the switch 306 is configured to connect a host machine 302 to the provisioning systems, the PXE can connect the device to the provisioning systems and boot the machine into a RAM (random access memory) disk or other block of storage, for example, which enables control operations such as firmware flashing or provisioning of a new customer image. A RAM disk with specialized drivers in one embodiment can be used to boot and/or run an untrusted or unknown image, which might not otherwise be able to boot on a specific machine. Provisioning images thus can be received, over the network to the PXE, which contain provisioning code or firmware flashing code. Once provisioning is completed, authorized customer networks 328 can interact with the devices 302 via the switch 306. The provisioning and control systems can control the switch in real time with no humans involved, as the automatic switching of that path can be based on provisioning events and external coordination, for example. The coordination can be provided and/or managed by an external system, such as a cloud manager database and system 330, or other such control plane or control system as discussed elsewhere herein, which can instruct the provisioning system(s) 326, console network 316, and rack components to perform certain actions. The cloud manager 330 can include one or more workflow systems that work with a central database, in one embodiment, to perform various aspects of resource management.

In an environment such as a cloud computing environment where different physical servers may be used to host customers at different times, it can be desirable to provide a level of abstraction for a user or customer network to avoid dependencies on resource allocations that can change over time. Virtual network equipment presentation such as customer network routers and customer network firewalls can also be achieved using overlay networking technology. For example, a customer's virtual local network or other virtual network between multiple computing nodes may be provided in at least some embodiments by creating an overlay network over one or more intermediate physical networks separating the multiple computing nodes. The overlay network may be implemented in various ways in various embodiments, such as by encapsulating communications and embedding virtual network address information for a virtual network in a larger physical network address space used for a networking protocol of the one or more intermediate physical networks.

This allows customers to utilize a standardized address space for addressing resources in the customer network. By utilizing a standardized address space, a customer can create a "virtual" or overlay network that can use common base addresses, sub-networks, etc., without the restrictions that the substrate network places on the physical address space.

Using virtualization, a number of virtual machine instances can be generated that appear and function to a user as being a part of the customer network, but that are mapped to actual servers or other physical resources in a separate or remote cloud, network, etc. As discussed, using a standardized address space can require the building and maintaining of a mapping between the physical substrate addresses and the virtual overlay addresses that are used for the customer address space. In some existing approaches, a central processing unit running on a host device can control the mapping of the virtual and physical addresses, such that a request received from a customer can be directed to the appropriate resource. This can take the form of data packet encapsulation and decapsulation, for example, wherein the physical address and/or header information can "co-exist" at various times with the virtual address and/or header information, such that a packet can be addressed to the virtual address by a source on the customer network, but can be properly routed to the appropriate physical address by adding the physical header information when in the cloud or remote network infrastructure.

Figure 4:
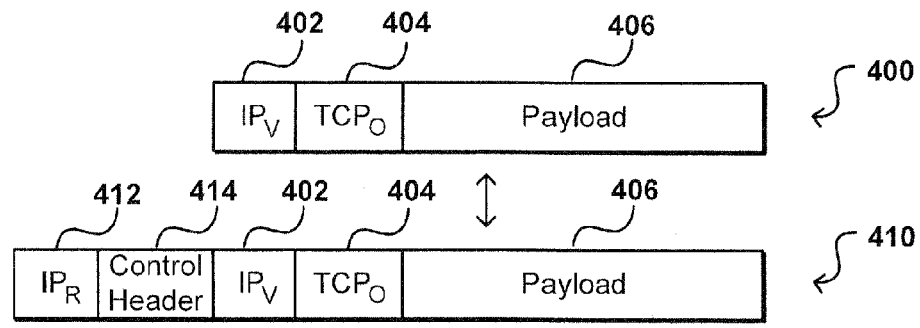
FIG. 4 illustrates a packet encapsulation process that can be used in accordance with one embodiment.

For example, FIG. 4 illustrates an example wherein a packet 400 received from a customer or "overlay" network is encapsulated in order to be routed within a physical substrate network on which the virtual cloud environment is hosted, in accordance with one embodiment. In this example, the received customer packet 400 includes three main parts: a virtual address 402 (such as a "virtual IP address" relevant to the customer overlay network, here denoted "$IP_v$"), a protocol header 404 (such as an original transmission control protocol header as found in the Internet Protocol suite, here denoted "$TCP_o$"), and a data or "payload" portion 406. The virtual IP address can be an address relevant only to the customer or overlay network. In order to properly route the packet to the intended destination host, this packet can be encapsulated to include an "external" data structure or frame that can route the packet within the substrate network or cloud or other such grouping of resources. In this example, the encapsulation process is shown to produce a "substrate" packet or datagram 410, which includes the $IP_v$, $TCP_o$, and payload of the original customer packet, but has appended thereto additional "header" information, here including a physical or "real" address 412 (such as the IP address or "$IP_R$" within the substrate network of the cloud) and a control header 414 (such as a protocol header useful by the control plane to process and/or route the packet). Without the appending any of this "real" information, the routers and other such components which host the cloud infrastructure would generally not be able to properly route the packets to the appropriate destination(s), since the customer routing information (e.g., embodied by 402) is only meaningful to the customer's overlay network and not the physical networking infrastructure to which the cloud host resources are connected. In some embodiments, any customer packet being received to a device in the cloud can be encapsulated to include this physical routing information to be used within the cloud. Since the first device to receive a packet in the cloud can be considered to be on the "edge" of the cloud, these devices will be referred to herein as "edge" devices. An "edge" device as used herein can refer to any device in hardware and/or software capable of receiving a packet of information from outside the cloud, and/or capable of transmitting a packet of information from inside the cloud. The encapsulation process can happen at any appropriate edge device in some embodiments, while in other embodiments the edge devices can route the packets to an encapsulation component or other device capable of encapsulating or decapsulating the packets. As should be understood, when a packet is to be transmitted hack to the customer network, or otherwise transmitted outside the cloud, a "decapsulation" process can be performed wherein the $IP_R$ 412 and a control header 414 are removed and the packet can be routed using the virtual address space information for the customer network. For purposes of simplicity the process of encapsulation will be discussed with respect to various embodiments, but it should be understood that a decapsulation process can also be performed using such components and processes in accordance with the various embodiments.

Certain conventional approaches perform a level of encapsulation on hardware such as host devices and servers. In these approaches, a central processor can perform the encapsulation procedure in order to route packets received to a network port, network interface card (NIC), or similar device. The encapsulation process in general is not exposed to the user. In some embodiments, the driver for the NIC would be directly accessible by the processor, such that the processor can access a mapping mechanism or distributed mapping service to map physical substrate packets to virtual overlay packets, and vice versa, before routing packets to, or from, the customer networks via the NIC. In some cases, the mapping information can be distributed from a centralized service to each appropriate node across the cloud.

As discussed, however, a resource provider might want the ability to provide users or customers with substantially full native access, or "bare metal" access, to a hardware resource such as a host machine. If the mapping is managed by an application executing on a CPU of the host machine, for example, then that mapping can potentially be accessed by a user or guest operating system (OS) executing on the host machine. Such access can potentially compromise the mapping service, and can enable a guest operating system to redirect packets, reject packets, or otherwise impact the processing of packets in the cloud network. Further, such functionality could be compromised such that packets can be sent to unintended locations outside the cloud. Other potential problems include "packet spoofing," wherein a host sends packets which appear to originate from a different host or location. This is often used to obfuscate where adversarial attacks are coming from, and also can be the basis of "ACK-based" Denial of Service (DoS) attacks, where acknowledgement packets that are part of standard network protocols are sent to hosts that never initiated transmissions, etc. Various other potential issues arise when the guest OS or CPU potentially has access to the mapping and/or encapsulation functionality.

Figure 5:
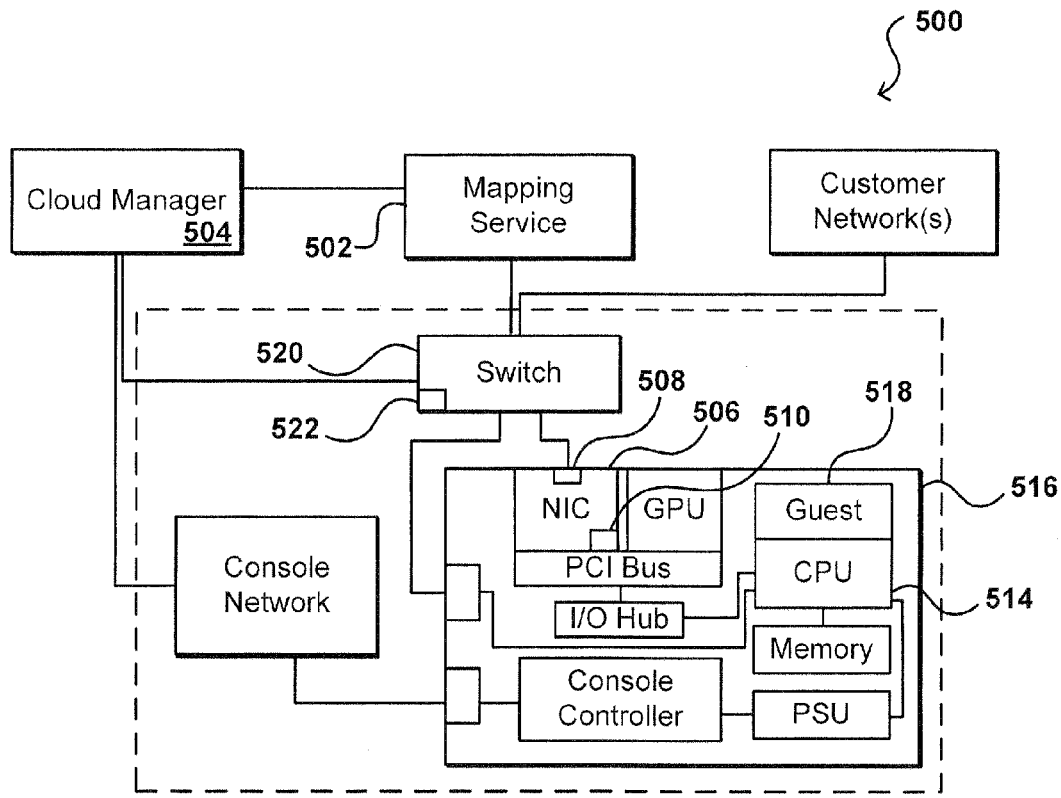
FIG. 5 illustrates configuration for processing packets that can be used in accordance with one embodiment.

Accordingly, systems and methods in accordance with various embodiments can provide substantially "bare metal" access to resources by various users, while performing operations such as encapsulation, decapsulation, and stateful firewalling operations using components that are not exposed to the customer, guest OS, CPU on a provisioned host machine, or other such potential sources of manipulation. FIG. 5 illustrates an example of a configuration 500 that can be used to perform packet-processing and other secure networking functions in accordance with various embodiments. In this example, packets are encapsulated "upstream" of the customer accessible host resources, here at the network card level, such as just before a packet is framed for physical interconnect transmission (e.g., Ethernet framing). In this example, it can be seen that the NIC 506 has an external port 508 that can communicate with components such as the cloud manager 504 and a mapping service 502. The external port 508 can enable these components to communicate with the NIC independent of the CPU 514 on the host machine 516, or any guest image 518 or guest OS provisioned on the host machine. Using such an approach, any packet transmitted to, or from, the cloud can be processed independent of the guest-accessible portions, such that the mapping is not accessible to, or modifiable by, the user. In this example, the NIC can have memory 510 and a processing device 512 capable of performing at least basic mapping, encapsulation, decapsulation, and/or similar such functions. This will be referred to generally herein as "NIC-based" encapsulation, although it should be understood that other peripheral devices or hardware components can perform similar functionality, and that the functionality is not limited to encapsulation but can also include other functions such as decapsulation, firewalling, etc. A NIC can function as an embedded system in the host machine that is not exposed to the user or guest operating system. In cases where the user might want native access to at least some of the functionality of the NIC, the NIC can have only certain memory portions mapped for the guest OS, such that only some functionality can be accessed. In some embodiments this can take the form of a virtual NIC image, wherein the guest OS can discover and/or utilize portions of the NIC, but cannot access portions utilized for secure actions such as encapsulation.

NIC-based encapsulation functionality can be provided on a per-host basis, or at least for those host machines capable of receiving and/or transmitting packets, and/or capable of having a customer image provisioned thereon. In such cases, the cloud manager 504 or a similar component or system can manage the distribution of mapping information to the various hosts and/or nodes, as well as other such aspects and configuration information useful for such processes. In such cases, the cloud manager can communicate with a NIC 506 via the external port 508 to update configuration information, firmware, or other information useful for performing encapsulation and similar such actions. Processes for updating configuration information via an external channel are disclosed in co-pending U.S. patent application Ser. No. 12/554,690, filed Sep. 4, 2009, which is hereby incorporated herein by reference. Using such an approach, the firmware and/or configuration information for the NIC can be updated to perform the desired functionality, as well as to communicate with the mapping service 502 or other appropriate component (s) as needed. The configuration can be updated periodically, as can be managed by the cloud manager and/or mapping system(s), such as to send large payloads or otherwise adjust functionality of the NIC.

In some embodiments, encapsulation and similar processes can be executed at other components that are not exposed to the user, such as a smart switch 520 configured to route messages to, and from, a NIC 506 and/or network port 520 of a host machine 516. Such a switch can include a processor 522 operable to perform operations such as encapsulation of packets, whereby the switch can process and route packets to the appropriate addresses in physical and/or virtual address space. In such cases, the host machine can be considered (from an address space perspective) as being outside the cloud, or trusted environment, whereby the switch can function as an edge device and modify packets received from the virtual address space of the host machine (and client networks) to the physical address space of resources in the cloud. Various other components can be used as well, such as routers or dedicated edge devices, within the scope of the various embodiments.

One of the limitations in many conventional systems is that the physical transmission path or "wire" can only allow for relatively small packets of information, such as 1.5 KB or 9 KB packets. The use of smaller packets is not strictly a physical consideration, but is also results from historical and protocol definition reasons. For example, in modern networks where most or all links are switched and the transmission rates are high, this limitation could be increased by orders of magnitude without intolerably increasing collisions. Even though a physical network interface, such as a NIC, can only transmit or receive 1.5 KB or 9 KB packets, it is desirable in at least some embodiments to transmit larger packets from the DOM-U to the DOM-0 network stack and on to NIC, and have the NIC segment the larger packet into multiple 1.5 KB or 9 KB packets. Many commodity NICs support advanced functionality such segmentation offload to address the this requirement. A NIC with segmentation offload capabilities can be configured to receive and/or buffer relatively large packets, and segment or frame those larger packets into smaller packets or Ethernet frames that comply with the 1.5 KB, 9 KB, or other such size restriction. Devices receiving these packets can be configured to reassemble the larger packets based on the plurality of smaller packets.

Many commodity NICs provide advanced features such as TCP segmentation offload that can assist with high-speed networking. Systems and methods in accordance with various embodiments can take advantage of such features to provide for "virtual" networking, such as where a customer has access to a host device sitting between a customer address space and a provider network address space. Typically, segmentation offload functionality works only with well known level four ("L4") protocols such as TCP. When the packets are encapsulated such as described in the previous paragraph with respect to FIG. 4, the L4 protocol is changed to something other than TCP. Thus, segmentation offload features on the NIC are not able to work on such encapsulated packets. As used in the art for describing layers between the physical hardware ("level one") and an application running on that hardware ("level seven"), level four refers to a "protocol" level, which in the case of Internet protocols can refer to protocols such as the Transmission Control Protocol (TCP) and User Datagram Protocol (UDP). Receive side TCP segment processing assumes that the TCP segment payload is entirely customer data (or other such data). Hence on the transmit side, encapsulation related metadata cannot be added to L4 payload in order to retain the original L4 header, as the addition of metadata would lead the receive side to corrupt packet payload with encapsulation/decapsulation metadata.

Another potential problem with existing encapsulation and/or overlay network implementations is that the headers often do not include physical port information, which is utilized by conventional hardware devices for purposes such as routing and load balance.

Systems and methods in accordance with various embodiments can address these and other such issues by using fake TCP header with fake or, in some cases, the original port numbers, where the header is extended following established protocol rules (e.g., TCP options) and the encapsulation/decapsulation in formation is passed in the protocol extension. A "fake" TCP header, for example, can include any convention-appropriate port information in addition to any appropriate TCP-related information. By including this fake port information, conventional routers and other such devices can obtain improved load distribution, as many conventional hardware devices base load distribution decisions at least in part upon the port specified in the header. A router or NIC can see an IP address and TCP information, for example, and can process the packet as a standard packet. Such an approach also can be advantageous as it can be implemented primarily in software using conventional hardware devices and networks.

Figure 6A:
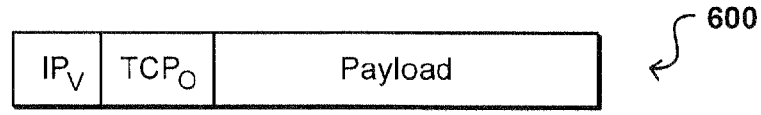
FIGS. 6(a)-6(d) illustrate packet framing options that can be used in accordance with various embodiments.
Figure 6B:
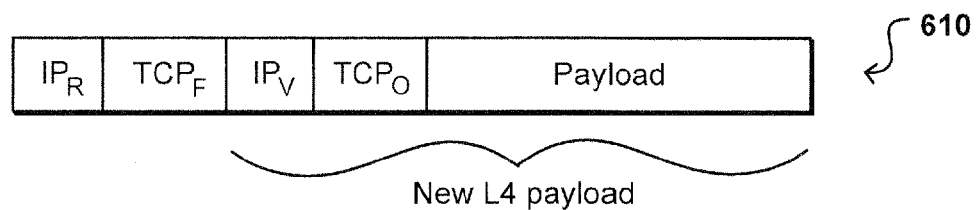

A protocol also can be used that does not change the level four payload (in the network stack, as discussed above). For example, FIG. 6(a) illustrates an original packet 600 that can be received from a user as discussed previously with respect to FIG. 4. This packet can include the payload (here a level four payload), along with a virtual IP address (at level three in the network stack) and an original TCP header (at level four). Using an encapsulation approach as discussed previously, a control host can attach a real address, such as $IP_R$, and a fake TCP header, $TCP_F$, (or $UDP_F$, for example) for use in routing the packet (or frame) in the physical or secure network. The packet after encapsulation 610 can appear as illustrated in FIG. 6(b), for example, wherein the original virtual IP address, TCP (or UDP, etc.), and payload information now effectively form the level four payload, with $IP_R$ forming the level three address and $TCP_F$ forming the level four protocol header. Since the packets have original or fake port numbers, such a format can also solve issues such as the router ECMP hashing issue mentioned previously. A conventional NIC or similar device, however, will not know how to properly split a 64K or similar packet according to the encapsulated frame, as the NIC will not be able to properly interpret the information now contained within the level four payload. Also, as discussed, the level four payload has changed by including the $IP_V$ and $TCP_O$ information.

Figure 6C:
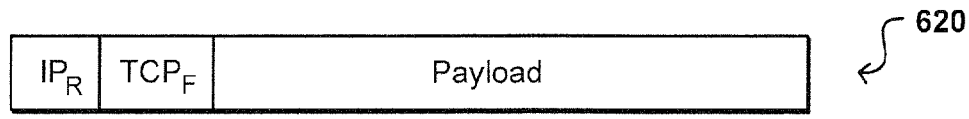

Systems and methods in accordance with various embodiments can instead take advantage of a slightly modified protocol format to handle the encapsulated packets. Conventional protocols provide for extra space at the end of a TCP header, which typically allows for what are referred to as "TCP options" or "TCP add-ons." These TCP options enable the TCP protocol to be expanded to include additional features. In some embodiments, the TCP packet can effectively be extended by about 24 bytes, with the additional information being declared as a TCP option. As should be understood, the packets can be extended by different amounts in different embodiments and/or implementations, and a 24 byte extension is just one example. The fake TCP header thus can include the original TCP information, plus the control header information. Information for the virtual IP address also can be included in this TCP option space. Thus, instead of adding the real headers during encapsulation and modifying the payload as in FIG. 6(b), the $IP_V$ and $TCP_O$ information can be included in the TCP options section of the fake TCP, as illustrated in FIG. 6(c), such that the payload or data portion is unchanged.

Figure 7:
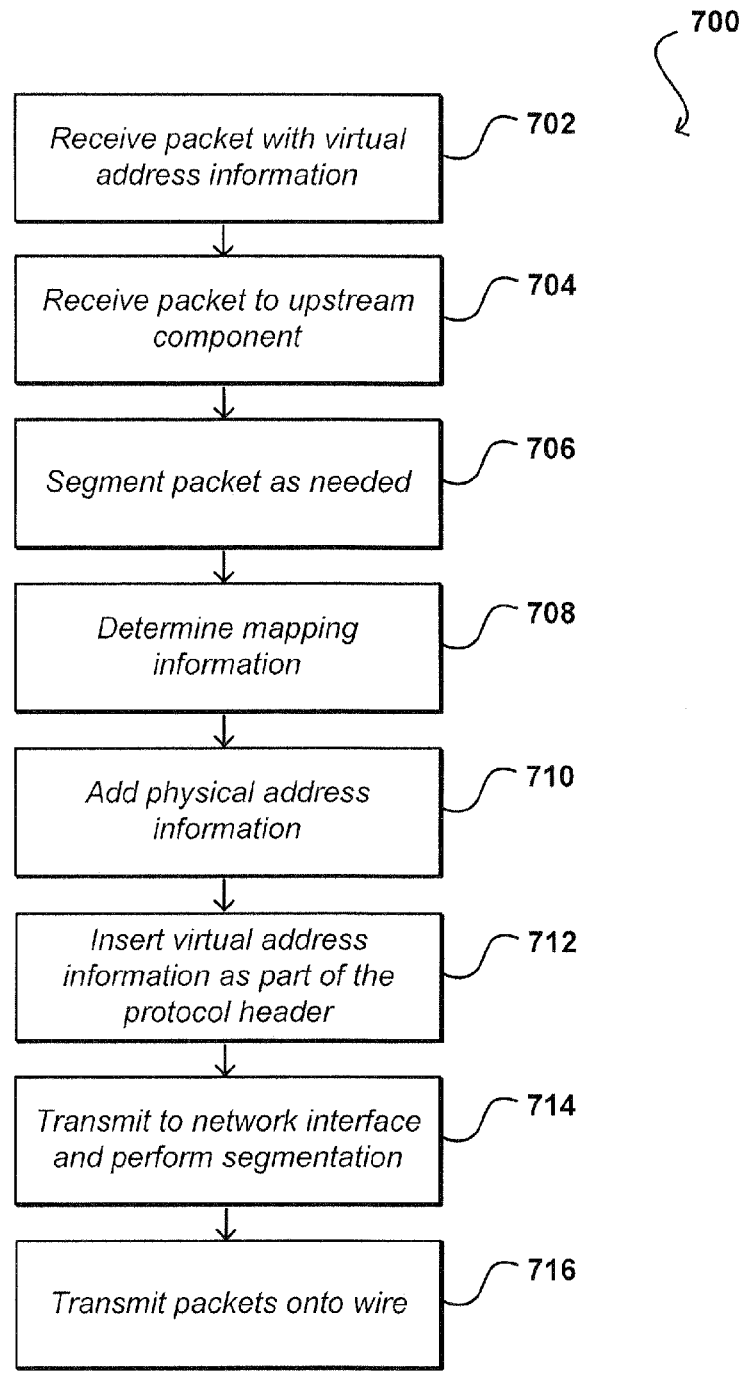
FIG. 7 illustrates an example of a first process for processing packets that can be used in accordance with various embodiment.

FIG. 7 illustrates an example of one such process 700 for managing packet information with respect to a virtualized environment that can be used in accordance with one embodiment. In this example, a packet is received that includes virtual address information 702. If received to a host device or other machine to which the user has substantially fully access, the packet is directed to one or more devices or components upstream of the user-controllable hardware 704, such that the user is unable to modify the routing and other such processing. The packet transmitted between components, such as from the guest to DOM-0, can be up to 64 KB in size in some embodiments, and thus can require segmentation 706. Mapping information for the packet can be determined 708, such as by contacting a mapping service to determine physical address information that corresponds to the virtual address information. Address information can be added to the received message 710, such as to an header (such as an $IP_R$ section), where the address information corresponds to the physical address to which the packet is to be directed. The virtual address information can be added to a protocol header, such as a TCP header, for the packet 712, without modifying the payload, such that the packet can still be routed, segmented, and otherwise processed by commodity hardware. The packet is transmitted to the NIC, which can segment the packets using TCP segmentation offload functionality 714 and transmit the resultant packets to the wire 716, and on to the final destination. As should be apparent similar functionality can be used to process packets received from a physical address space, wherein mapping information is determined for the packet and virtual address information is added to the packet. Where the virtual mapping information does not specify a port, a "fake" port can be used that enables the packet to be processed on its way to the virtual destination, such as to enable load balancing or similar functionality.

Figure 8:
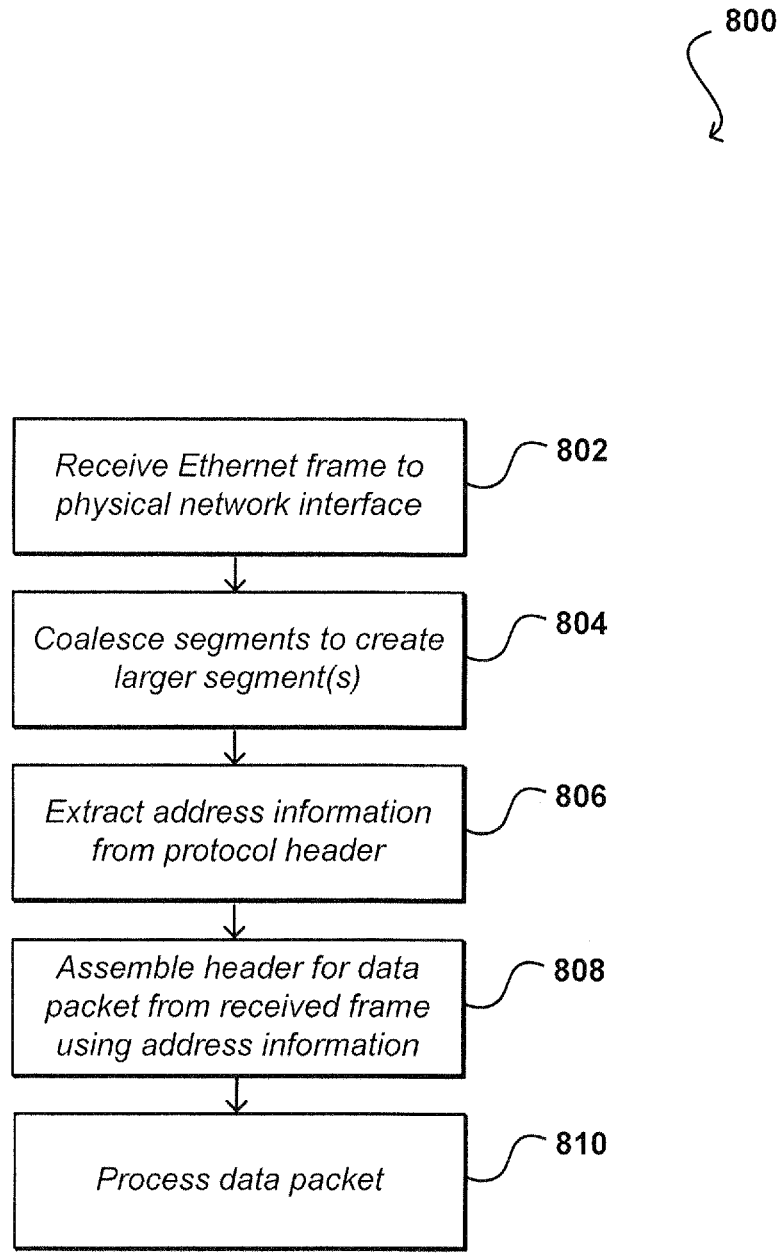
FIG. 8 illustrates an example of a second process for processing packets that can be used in accordance with various embodiments.

FIG. 8 illustrates an example of a similar process 800 for managing packet information with respect to a virtualized environment in accordance with one embodiment. In this example, an Ethernet frame is received to a physical network interface (e.g., a NIC), where the frame includes physical address information 802. Segments with information such as $IP_R$ and $TCP_F$ can be coalesced in some embodiments to generate one or more larger segments 804, which can improve performance. This can also be done by commodity NICs that support Receive Side Coalescing, since the packet format follows all TCP format rules and the TCP payload is exactly the same as customer packet's payload. The NIC (or other such device) is upstream of the user-controllable hardware, such that the user is unable to modify the routing and other such processing. Virtual address information can be extracted from the protocol header, such as a TCP header, for the payload 806, after removing header and footer framing information, for example. The virtual address in formation can be used to assemble a header for the data packet 808, extracted from the received. Ethernet frame. The packet then can be processed 810, such as by transmitting the packet to a destination in the virtual address space. As should be apparent similar functionality can be used to process Ethernet frames received from a virtual address space, wherein virtual address information is extracted from the header for the packet.

Simply extending the TCP header may not be desirable in some embodiments, however, as if each packet received is 1.5K, and 24 bytes of information is added to each of these packets, then the packets would each now be over the 1.5K transmission limit and would each need to be divided into two packets, which can lead to an undesirable amount of overhead and additional traffic. It thus can be desirable in at least some embodiments to utilize this additional information while not significantly increasing the overhead.

Figure 6D:
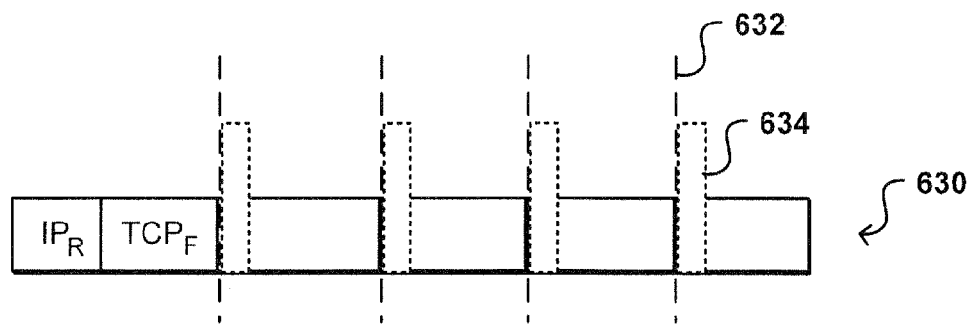

Various embodiments take advantage of the fact that information such as the $IP_V$ and $TCP_O$ information are not needed for each packet upon segmentation, but can be determined upon desegmentation. One approach thus is to take the additional information for the $IP_V$ and $TCP_O$ information, etc., (about 24 bytes in one example) and create encoded information (about 120 bytes in one example), that in one embodiment is approximately one to five instances of the information in various embodiments, although other lengths of encoded information can be used as well, such as may depend upon the hashing technique. The encoded information can be reconstructed using a hashing or similar mechanism such that the original information can be reconstructed from at least 24 bytes of hashed metadata, which could be obtained from one or more instances of the segmented packet. Thus, instead of adding 24 bytes to each packet segment, for example, the additional 120 bytes or so can be split into appropriate number of pieces and can be positioned strategically along the payload, such as at boundaries where the data will be segmented. For example, a NIC or similar device can know that the data will be segmented automatically based on size at certain locations (including the additional 50 bytes). Example segmentation lines 632 for a packet 630 are illustrated in FIG. 6(d). Since these segmentation locations are known, the NIC can insert the instances of the additional information at these segment lines (or otherwise within different segments) such that at least five of the 1.5K packets (or any other appropriate number of an appropriate size) will have information for the $IP_V$ and $TCP_O$ stored therein, but each packet will not include all 10 bytes of additional information.

When the packets are received, a desegmentation process can occur as with conventional systems. When the 1.5K segments are assembled into the 64K payload, or during the desegmentation process, the portions of information 634 can be used to reconstruct the $IP_V$ and $TCP_O$ information, etc. An advantage to using a hashing process and distributing the information among the various packets, for example, is that the $IP_V$ and $TCP_O$ information can be reconstructed even if some of the 1.5K packets are lost, as long as at least two segments with the portions of information 634 are received. The entire payload may not be able to be reconstructed, but at least the header information can be reconstructed. Further, the receiving device can simply request those 1.5K segments (e.g., Ethernet frames) that were not received, since the header information can be reconstructed, and hence does not need to request resending of the entire payload. Such an approach can have a much lower jitter variance, as there often will be no need to resend large packets, which could result in large variations in performance. In the case of video traffic, for example, as long as the data lost is not significant, the lost traffic can be neglected and thus need not be requested in at least some embodiments. This is an advantage of being able to receive partial segments successfully.

Figure 9:
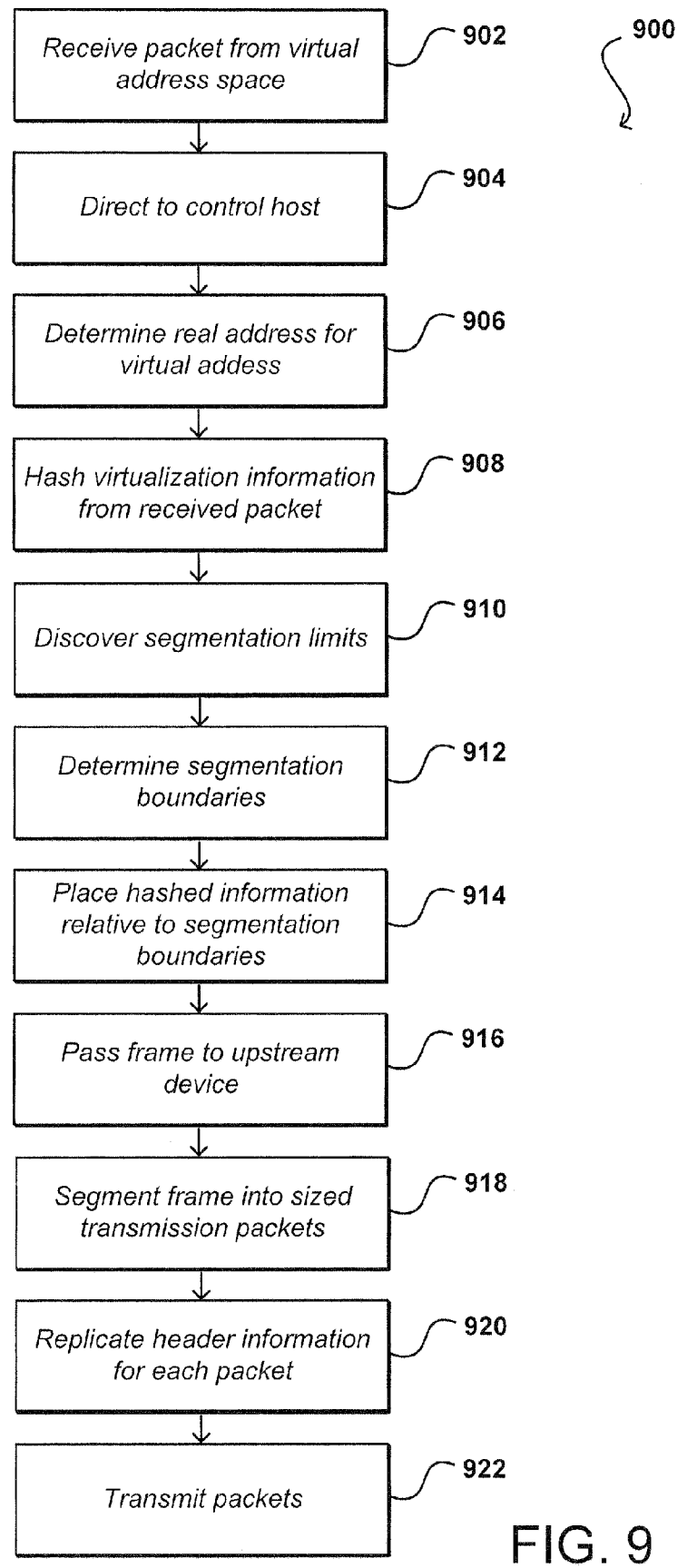
FIG. 9 illustrates an example of a third process for processing packets that can be used in accordance with various embodiments.

FIG. 9 illustrates an example of a process 900 that can be used to process packets for a virtualized environment in accordance with various embodiments. In this process, a packet is received from a customer address space 902, which includes virtual address information. As discussed, the initial packet received from the user can be a 64K packet with $IP_V$ and $TCP_O$ information. The packet can be received or directed to a control host or another such secure component 904, which is at least partially inaccessible to a user of a customer-partitioned device. The virtual address information can be translated to a real address using the secure component 906, such as by contacting a mapping service as discussed above. The TCP header (or other protocol header) can be updated if desired, but additional information such as the $IP_V$ and $TCP_O$ information can instead be inserted into the data. When adding the $IP_V$ and $TCP_O$ information to the data, this "virtualization" information can be hashed or otherwise split into multiple portions 908. If not already determined, the secure device can discover the segmentation limits for the transmission path 910, and boundaries for the segments of the user payload can be determined 912. The portions of the virtualization information can be placed adjacent to, or positioned with respect to, segmentation boundaries in central packets of the payload 914. The "new" packet or frame then can be passed on to the NIC or other such secure device 916, for example, which can automatically segment the packet into a set of packets of the determined size 918, such as 1.5K packets, with the number of segments depending at least in part upon the size of the overall packet. The IP and TCP header can be replicated for each packet, with potentially some small changes to compensate for the overall change in size, using segmentation offload processes of the NIC or other such device 920. The packets can then be transmitted to the destination 922.

Figure 10:
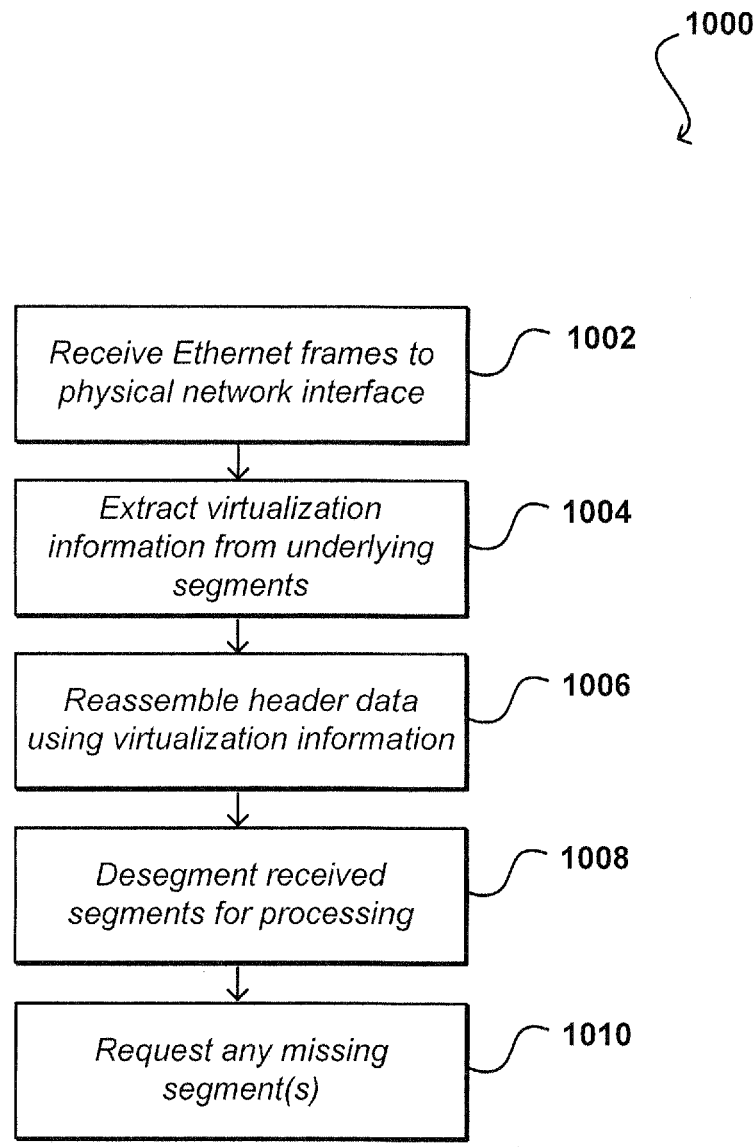
FIG. 10 illustrates an example of a fourth process for processing packets that can be used in accordance with various embodiments.

FIG. 10 illustrates an example of a similar process 1000 that can be used to process packets for a virtualized environment in accordance with various embodiments. In this process, a set of Ethernet frames is received 1002, at least some of the Ethernet frames including "virtualization" information that has been hashed or otherwise split into multiple portions. The virtualization information can be extracted from the underlying segment of each frame that includes a portion of the virtualization information in the associated payload 1004. The virtualization information (e.g., header data) is reassembled 1006, as long as a sufficient number of frames including the virtualization information was received, and the received packets can be desegmented to the extent possible 1008. If not all frames were received but the header data was able to be reassembled, a request for only the missing segments can be sent 1010.

When at least a majority of the packets are ultimately received at a destination, or device along the path to the destination, the device can attempt to desegment or reassemble these packets into at least one larger segment, if not the full 64K or other packet. As long as two packets (or a smaller number of packets than was generated originally during segmentation where the number of packets needed is determined by specific hashing technique) with additional header information in the payload are received, in at least some embodiments, these packets can be used to reconstruct the header data and desegment the packets, replacing the real address and protocol information with information for the virtual or client network, whereby the larger assembled segments can be passed on to the client or other destination. In some embodiments the desegmentation can occur on a NIC or similar device, while in other embodiments the desegmentation can occur using the guest operating system on a receiving device, etc. Further, various steps of the above process can be performed in any appropriate order, or in parallel, and fewer, additional, or alternative steps are possible within the scope of the various embodiments.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computer-implemented method, comprising:
under control of one or more computer systems configured with executable instructions,
receiving an initial set of Ethernet frames, at least some frames of the initial set of Ethernet frames including segments having virtualization information;
extracting the virtualization information from the segments;
determining that a predetermined number of Ethernet frames including segments having virtualization information have been received;
reassembling header data using the virtualization information; and
desegmenting the received segments for processing.

2. The computer-implemented method of claim 1, further comprising determining whether there are one or more additional Ethernet frames not included in the initial set of Ethernet frames.

3. The computer-implemented method of claim 2, further comprising initiating a request for the one or more additional Ethernet frames not included in the initial set of Ethernet frames.

4. The computer-implemented method of claim 1, further comprising reassembling the segments into at least one larger segment.

5. The computer-implemented method of claim 1, wherein desegmenting the received segments for processing is performed using commodity hardware.

6. The computer-implemented method of claim 5, wherein the commodity hardware includes at least one network interface card (NIC) configured to perform segmentation offload for the segments.

7. The computer-implemented method of claim 1, wherein reassembling the header data includes replacing real address information with information for a virtual network.

8. A system, comprising:
a processor; and
a memory device including instructions that, when executed by the processor, cause the processor to:
receive an initial set of Ethernet frames, at least some frames of the initial set of Ethernet frames including segments having virtualization information;
extract the virtualization information from the segments;
determine if a predetermined number of Ethernet frames including segments having virtualization information have been received;
reassemble header data using the virtualization information; and
desegment the received segments for processing.

9. The system of claim 8, wherein the instructions when executed further cause the processor to:
determine whether there are one or more additional Ethernet frames not included in the initial set of Ethernet frames.

10. The system of claim 9, wherein the instructions when executed further cause the processor to:
initiate a request for the one or more additional Ethernet frames not included in the initial set of Ethernet frames.

11. The system of claim 8, wherein the instructions when executed further cause the processor to:
reassemble the segments into at least one larger segment.

12. The system of claim 8, wherein desegmenting the received segments for processing is performed using commodity hardware.

13. The system of claim 12, wherein the commodity hardware includes at least one network interface card (NIC) configured to perform segmentation offload for the segments.

14. The system of claim 8, wherein reassembling the header data includes replacing real address information with information for a virtual network.

15. A non-transitory computer-readable storage medium storing instructions that, when executed by a processor of a computing system, cause the computing system to:
receive an initial set of Ethernet frames, at least some frames of the initial set of Ethernet frames including segments having virtualization information;
extract the virtualization information from the segments;
determine if a predetermined number of Ethernet frames including segments having virtualization information have been received;
reassemble header data using the virtualization information; and
desegment the received segments for processing.

16. The non-transitory computer-readable storage medium of claim 15, further comprising:
determining whether there are one or more additional Ethernet frames not included in the initial set of Ethernet frames.

17. The non-transitory computer-readable storage medium of claim 16, further comprising initiating a request for the one or more additional Ethernet frames not included in the initial set of Ethernet frames.

18. The non-transitory computer-readable storage medium of claim 15, further comprising reassembling the segments into at least one larger segment.

19. The non-transitory computer-readable storage medium of claim 15, wherein desegmenting the received segments for processing is performed using commodity hardware.

20. The non-transitory computer-readable storage medium of claim 15, wherein reassembling the header data includes replacing real address information with information for a virtual network.

* * * * *